(12) United States Patent
Arendt et al.

(10) Patent No.: US 8,034,860 B2
(45) Date of Patent: Oct. 11, 2011

(54) ORGANOSOL PLASTISOL COMPOSITIONS

(75) Inventors: William D. Arendt, Libertyville, IL (US); Makarand V. Joshi, Grayslake, IL (US); Danielle C. Petrovich, Glendale Heights, IL (US)

(73) Assignee: Eastman Specialties Holdings Corporation, Kingsport, TN (US)

( * ) Notice: Subject to any disclaimer, the term of this patent is extended or adjusted under 35 U.S.C. 154(b) by 753 days.

(21) Appl. No.: 11/459,166

(22) Filed: Jul. 21, 2006

(65) Prior Publication Data

US 2008/0021141 A1    Jan. 24, 2008

(51) Int. Cl.
*C08K 5/05* (2006.01)
*C08L 27/06* (2006.01)
*C08L 57/00* (2006.01)
*C08J 3/11* (2006.01)
*C08J 3/18* (2006.01)
*C08J 3/20* (2006.01)

(52) U.S. Cl. .................. 524/293; 524/314; 524/569

(58) Field of Classification Search .............. 524/293, 524/314, 569
See application file for complete search history.

(56) References Cited

U.S. PATENT DOCUMENTS

| | | | |
|---|---|---|---|
| 2,585,448 A | 2/1952 | Emerson et al. | |
| 2,637,714 A | 5/1953 | Emerson et al. | |
| 2,700,656 A | 1/1955 | Emerson et al. | |
| 3,046,237 A | 7/1962 | Rosenfeldner et at | |
| 3,072,591 A | 1/1963 | Fath | |
| 3,370,032 A | 2/1968 | Potter | |
| 3,736,348 A | 5/1973 | Gough et al. | |
| 3,785,977 A | 1/1974 | Flowarday et al. | |
| 3,939,201 A | 2/1976 | Bacskai | |
| 3,950,198 A * | 4/1976 | Cannon et al. .................. 156/79 |
| 3,975,338 A * | 8/1976 | Tsubata et al. ................. 526/345 |
| 4,002,702 A * | 1/1977 | Kuhn ............................ 525/239 |
| 4,950,702 A | 8/1990 | Arendt | |
| 4,981,889 A | 1/1991 | Baba et al. | |
| 5,006,585 A | 4/1991 | DiBella | |
| 5,177,135 A | 1/1993 | Wehner et al. | |
| 5,319,028 A | 6/1994 | Nakamura et al. | |
| 5,739,203 A | 4/1998 | Ngoc | |
| 6,531,533 B1 | 3/2003 | Kuhn et al. | |
| 6,689,830 B1 | 2/2004 | Arendt et al. | |
| 6,933,337 B2 | 8/2005 | Lang et al. | |

FOREIGN PATENT DOCUMENTS

| | | |
|---|---|---|
| GB | 715995 | 9/1954 |
| JP | 2003-192866 A | 7/2003 |
| JP | 2003192866 A * | 7/2003 |
| WO | WO 01/00722 | 1/2001 |

OTHER PUBLICATIONS

See Richard J. Lewis, Sr., Hawley's Condensed Chemical Dictionary, 13th Edition, p. 825 (1997).*
Translation to Kobayashi et al. (JP 2003192866), Jul. 2003.*
A. V. Bailey et al., Preparation of Some Mixed Diesters of Aliphatic Diols and Their Evaluation as Plasticizers, *Journal of the American Oil Chemists' Society*, vol. 53, pp. 176-178, May 1976.

* cited by examiner

*Primary Examiner* — Kelechi Egwim
(74) *Attorney, Agent, or Firm* — Brett L Nelson; Bernard J. Graves, Jr.

(57) ABSTRACT

Both the viscosity of a plastisol comprising a dispersed polymer, a plasticizer for the polymers and at least one liquid diluent, and exudation of liquids from articles formed from the plastisol are minimized when the difference between 1) the weighted average of the Hildebrand solubility parameter values of all liquid ingredients, including plasticizer, in the plastisol and 2) the Hildebrand solubility parameter of the dispersed polymer is ±0.6 to ±1. The plastisols of the present invention are suitable for fabrication into films and molded objects, and as coating materials for a variety of metallic and non-metallic substrates.

22 Claims, No Drawings

ORGANOSOL PLASTISOL COMPOSITIONS

This invention relates to plastisol compositions. More particularly, this invention relates to plastisol compositions where the viscosity of the plastisol is minimized when the types and concentrations of the liquid ingredients, including plasticizer, yield a weight averaged Hildebrand solubility parameter for these ingredients that is within specified limits relative to the solubility parameter of the polymer portion of the plastisol.

BACKGROUND

Plastisols comprise a dispersed phase that includes but is not limited to finely divided particles of a non-crosslinked thermoplastic organic polymer and a liquid phase comprising a plasticizer for the polymer. Some texts on the subject define plastisols as including any organic polymer as the dispersed phase, while others limit the polymer to homo- and copolymers of vinyl chloride. The description of the present invention employs the broader definition.

Major end use applications of plastisols are as films, coatings and molding materials. Films and coatings are prepared by applying the plastisol to a surface as a flowable liquid. The layer of plastisol is then heated to evaporate any volatile liquids and fuse the particles of polymer to form a solid layer.

Plasticizers can be categorized based on their ability to solvate the dispersed polymer. Certain esters of phthalic acid, such as the mixed butylbenzyl ester (BBP) and benzoates of glycols such as diethylene and dipropylene glycols are particularly good solvators for polyvinyl chloride. The benzoates are therefore preferred for use in plastisol formulations containing this polymer that will be subjected to rapid processing. For many end use applications the high viscosity imparted by solvating plasticizers requires use of liquid hydrocarbons, ketones, or other classes of organic liquids to achieve the desired processing viscosity. The resultant plastisols are referred to as organosols and the organic liquids as diluents. The concentration of organic liquid in an organosol is typically greater than 5 weight percent, based on the total weight of the plastisol.

Plastisols containing other diesters of phthalic acid such as bis(2-ethylhexyl phthalate), a moderate solvating plasticizer for PVC referred to in the literature as DOP, are less likely to exhibit the substantially increased viscosity associated with the higher solvating plasticizers mentioned hereinbefore, but may still require use of an organic liquid or other viscosity suppressant(s).

Chapter 26 in volume III of a text entitled Encyclopedia of PVC Technology discusses the use of liquid hydrocarbon diluents as rheology control agents in PVC plastisols and organosols. The hydrocarbons evaluated included aliphatic hydrocarbons, and mixtures of aliphatic with 13, 16 and 98 volume percent of aromatic hydrocarbons. The data in this chapter demonstrate that the viscosity of the plastisol increased from 2.0 to 3.3 Pascal seconds (Pa·s) with increasing aromatic hydrocarbon content of from 0.02 to 98 percent. Both of these viscosity values are within the processable range.

Low viscosity plastisols prepared by mechanically dispersing a paste consisting essentially of finely divided particles of polyvinyl chloride in a plasticizer are described in U.S. Pat. No. 4,950,702, which is incorporated herein by reference. The low viscosity exhibited by the resultant plastisol results from use of either dipropylene glycol monomethyl ether benzoate or tripropylene glycol monomethyl ether benzoate as the plasticizer. The viscosity of the plastisols are sufficiently low that they do not require use of an organic liquid to facilitate fabrication of slush molded articles or coating of the plastisol on to a self-supporting substrate such as a resilient flooring construct.

The effects of various solvents on dilatancy in concentrated phthalate ester plasticized emulsions of polyvinyl chloride were investigated by S. J. Wiley and C. W. Macosko and the results reported in the Journal of Rheology (Volume 26, Issue 6, pp 557-564). The effect of specific solvents on the strength of interparticle interactions was interpreted in terms of steric stabilization theory. The flow strength required to effect dilatancy decreased as the solvent quality of the continuous phase was reduced.

The prior art contains a variety of mathematical formulae for predicting the compatibility of polymers with various liquids, including plasticizers. The term "solubility parameter" was first used by Joel H. Hildebrand to quantify the solvating ability of specific solvents. Hildebrand expressed this parameter as the square root of the cohesive energy density, c, which had previously been defined as $c=(\Delta H-RT)/V_m$. The solubility parameters for numerous organic compounds have been calculated using the formula developed by Hildebrand.

It was subsequently discovered that pairs of polar and non-polar molecules, which should be compatible on the basis of similar solubility parameter values calculated using Hildebrand's formula, were in fact immiscible. The presence of polar groups and the possibility of hydrogen bonding between molecules affected the solubility parameter of a molecule. Hansen considered both of these types of intermolecular interactions in developing his formula in which the total solubility parameter of a molecule is equal to the square root of the sums of the dipole, polar and hydrogen bonding contributions to the solubility of the molecule.

P. Teas developed a method for depicting the contributions of the three types of intermolecular interactions described by Hansen in two dimensions using a triangular graph. Scales for each of the three interactions appear on the three sides of the triangle When the magnitudes of the three types of Hansen interactions are determined for a particular organic liquid, the values are plotted as a single point on the graph. A group of suitable solvents for the polymer can be defined by experimentally determining which members of a groups of organic liquids exhibiting similar solubility parameter values, as represented by adjacent points on the graph, actually swell the polymers and encircling the points representing these liquids.

P. A. Small developed a method for determining the solubility parameter of compounds, including plasticizers and polymers, by dividing 1) the sum of the molar attraction constants, also referred to as "Small's constants", exhibited by the functional groups in the compound by 2) the molar volume of the compound. Small's work is reported in the Journal of Applied Chemistry, 3, 76-80 (1953), which is hereby incorporated by reference. Unless otherwise indicated, all solubility parameter values in the following sections are expressed in Hildebrand units. The Small's constants for many solvents are reported in literature issued by suppliers of these solvents.

SUMMARY

A plastisol is provided that includes: A. a dispersed phase comprising particles of a fusible organic polymer; and B. a liquid phase comprising 1) a plasticizer for said polymer and 2) from 5 to 55 weight percent, based on the total weight of said liquid phase, of an organic diluent. A weighted average of individual Hildebrand solubility parameter values for ingredients of the liquid phase of said plastisol differs from Hildebrand solubility parameter value of said polymer by about ±0.6 to about ±1.0. In an important aspect, both the viscosity of a plastisol and exudation of liquids from articles formed from the plastisol are minimized when the difference between 1) the weighted average of the Hildebrand solubility parameter values of all liquid ingredients in the plastisol and 2) the Hildebrand solubility parameter of the organic polymer constituent is ±0.6 to ±1. When Hildebrand solubility parameter values have been calculated for individual liquids in a compatible mixture, a weight averaged solubility parameter for the mixture can be calculated by 1) multiplying the solubility parameter value for each component by its weight fraction in the mixture and then 2) adding these calculated values. The result of this calculation will be referred to hereinafter as the weighted average solubility parameter.

In another aspect, a method for preparing a plastisol is provided that predictably yields low viscosity plastisols comprising a) finely divided particles of a least one organic polymer, b) at least one plasticizer for the polymer(s), including those that, based on their Hildebrand solubility parameter values, would be expected to impart a high viscosity to a plastisol, and c) an organic liquid as a diluent for plastisol. Selection of a proper type and amount of diluent is made possible using a mathematical relationship between a) the Hildebrand solubility parameter value of the polymer portion and b) a weighted average of the Hildebrand solubility parameter values of all liquid ingredients of the plastisol. In the past the selection of suitable diluent/plasticizer combinations was typically a process of trial and error. The plastisol compositions are effective for providing a coating binder.

In another aspect, a liquid blend is provided that includes esters of mono and diisobutyrates of 2,2,4-trimethyl-1,3-pentanediol and an organic diluent. The organic diluent is a blend of cycloaliphatic hydrocarbons and both linear and branched paraffinic hydrocarbons. Importantly and unexpectedly, the liquid blend is miscible.

DETAILED DESCRIPTION

The present inventors discovered that replacing butylbenzyl phthalate (BBP) with the dibenzoates of diethylene glycol and dipropylene glycol in a specific plastisol formulation resulted in a 25-fold increase in plastisol viscosity. The resultant plastisol was too viscous for processing using conventional equipment. This viscosity could not be reduced to a processable level using a liquid hydrocarbon mixture traditionally used with plastisols containing BBP as the plasticizer. The hydrocarbon mixture evaluated in both plastisols contained 63 weight percent of aromatic hydrocarbons, 15 percent of mixed aliphatic hydrocarbons and 22 percent of normal paraffinic hydrocarbons.

While exploring possible explanations for the aforementioned unexpectedly large increase in viscosity that occurred when BBP was replaced with a benzoate ester the present inventors discovered that the viscosity of a plastisol comprising a dispersed polymer, a plasticizer and a solvent is directly related to a hitherto undisclosed mathematical relationship between a) the Hildebrand solubility parameter of the polymer and b) the weight average of the Hildebrand solubility parameters of the organic diluent(s), plasticizer and any other liquid ingredients present in the plastisol. It was determined that the difference between a) and b) must be within specified limits to avoid, on the one hand, too high a plastisol viscosity or, on the other hand, the possibility of exudation of liquids from articles formed from the plastisol.

The solubility parameters of many plasticizers, polymers, and liquid organic compounds suitable as diluents for the present plastisols are available in publications or can be calculated from experimental data such as surface tension values using mathematical formulae such as the one developed by Small (Journal of Applied Chemistry, 3, 76-80 (1953)), which is incorporated herein by reference.

The term "about" appears in the definition of the ranges for solubility parameter values in the foregoing description of the present invention because 1) measurements of the physical properties, including surface tension among others, that are used to calculate the solubility parameter values exhibited by the polymer, diluent(s) and other liquid ingredients of the plastisol can vary by as much as ±5 percent or more due to the experimental conditions under which they are measured and 2) the Small's constants used to calculate the solubility parameter values reported herein are only approximations and will vary depending upon the environment of the functional groups on which they are based. Even though the limits that define the present operable ranges of weighted average solubility parameter values of the liquid phase may be approximate, selecting a value within these ranges will enable one skilled in plastisol formulation to prepare of low viscosity plastisols with a minimum of experimentation.

As used herein. the term "plastisol" refers to liquid polymer compositions comprising a particulate form of at least one organic polymer suspended in a liquid medium that includes at least one plasticizer for the polymer and at least one liquid organic compound that functions as a diluent. Plastisols containing a total of more that about five weight percent of one or more of these liquid diluents in addition to the required plasticizers are also referred to as "organosols".

As used herein, "coating binder" means the polymeric part of the film of the coating after solvent has evaporated.

As used herein, the term "miscible" means a liquid which is dissolved or is soluble in a liquid. "Dissolved" means that the material which is dissolved does not exist in a liquid in particulate form having at least about 5 weight percent particles having diameters greater than about 30 nM which are as measured by dynamic light scattering. "Soluble" means a liquid dissolved in a liquid or a solid dissolved in a liquid.

In addition to imparting a low viscosity to the plastisol, the combinations of liquid ingredients in the present plastisols are sufficiently compatible with the polymer that these liquids will not exude from articles formed from the plastisol.

Polymers

Any of the known polymers that can be formulated into a plastisol can be used to prepare low viscosity plastisols in accordance with the present invention. The polymers constituting the dispersed phase of the present plastisols include polymers of ethylenically unsaturated organic monomers and mixtures of these monomers that can be prepared by a free radical-initiated emulsion polymerization. Suitable monomers include but are not limited to 1) ethylenically unsaturated halocarbons such as vinyl chloride, 2) ethylenically unsaturated acids such as acrylic and methacrylic acids and esters thereof with alcohols containing up to eight or more carbon atoms, and 3) copolymers of vinyl alcohol with olefins such as ethylene.

Homopolymers and copolymers of vinyl chloride and the homo- and copolymers of esters of acrylic and methacrylic acid are preferred based on their wide range of commercial applicability in plastisols containing esters of benzoic acid as the plasticizer. Vinyl chloride polymers suitable for preparing the present plastisols are classified according to particle size.

Dispersion grade resins typically exhibit particle sizes of from 0.5 to about 5 microns, and blending grade resins from about 20 to about 55 microns.

Plasticizers

Any of the known organic plasticizers that are liquids at about 25° C. can be used to prepare low viscosity plastisols in accordance with the present invention. Many of these plasticizers are esters of mono- and dicarboxylic acids. A detailed discussion of suitable plasticizers can be found in The Technology of Plasticizers, Edited by J. Kern Sears and Joseph R. Darby, published by John Wiley and Sons (1982), which is incorporated herein by reference.

Plasticizers preferred for use in preparing the low viscosity plastisols of the present invention include but are not limited to:

diesters of benzoic acid with dihydric alcohols, glycols and ethers of glycols, and diesters of phthalic acid and monohydric alcohols.

Monohydric alcohols suitable for preparing esters of phthalic acid contain from 1 to 8 or more carbon atoms in a linear or branched configuration and include but are not limited to methyl, ethyl, propyl, isopropyl, 2-ethylhexyl, isononyl and benzyl alcohols. Dihydric alcohols suitable for preparing esters of benzoic acid include but are not limited to propylene glycol and oligomeric ether glycols such as diethylene glycol, triethylene glycol, dipropylene glycol and 1,3-butanediol.

The benzoate and phthalate plasticizers can be used individually or in mixtures. Suitable mixtures include combinations of ethylene glycol and propylene glycol esters of benzoic acid that form eutectic mixtures with melting points below 25° C. Mixtures of benzoic acid esters derived from the dimeric and/or trimeric glycol ethers of ethylene and propylene glycols are particularly preferred plasticizers for the present plastisol compositions. The solubility parameter values for the preferred benzoic acid plasticizers are typically greater than 10. The solubility parameters of preferred phthalate ester plasticizers such as butyl benzyl phthalate are typically less than 10.

Auxiliary Plasticizers

In addition to the plasticizers listed in the preceding section, which can also be referred to as primary plasticizers, the present plastisols can optionally include one or more auxiliary plasticizers which, while not effective plasticizers when used alone, act in combination with primary plasticizers to adjust the viscosity of the plastisol to the desired level. Preferred secondary plasticizers are 1) liquid monobenzoates derived from benzoic acid and a monohydric alcohol such as 2-ethylhexanol, isooctanol or isononanol and 2) liquid monobenzoates of diols, glycols and ethers of glycols containing from 2 to 8 or more carbon atoms, and 3) commercially available esters of diols, such as the mono- and diisobutyrates of 2,2,4-trimethyl-1,3-pentanediol.

Organic Diluent

The third required component of the present plastisols is at least one organic diluent that is not a solvent for the polymer at the required concentration level. Preferred diluents include hydrocarbons and ketones that are liquids at 25° C. Liquid hydrocarbons are typically supplied as mixtures of aromatic and/or aliphatic hydrocarbons boiling within a specified temperature range.

Mixtures of cycloaliphatic hydrocarbons alone or in combination with linear and branched aliphatic hydrocarbons are suitable diluents for plastisols containing vinyl chloride and at least one glycol ester of benzoic acid as the primary plasticizer. The total concentration of all diluents is typically from about 2 to about 55 percent, preferably from about 10 to 50 percent, based on the total weight of the plasticizer and any other liquid ingredients present in the plastisol.

When present at the desired concentration level the diluent portion of the plastisol contributes to a weight averaged value for the solubility parameters of all liquid ingredients that is within the present ranges of from 0.6 to 1 on either side of the Hildebrand solubility parameter of the polymer, which is 9.6 for PVC.

When the plasticizer is a diester of phthalic acid such as butyl benzyl phthalate, a high solvating plasticizer for vinyl chloride polymers, preferred diluents are mixtures of aromatic hydrocarbons together with straight chain and branched chain alkanes. The Hildebrand solubility parameters for commercially available hydrocarbon mixtures are 8.4 for alkybenzenes and 7.2 for normal paraffinic hydrocarbons.

It should be apparent from the foregoing discussion that the choice of a particular organic liquid or mixture of these liquids as a diluent is based not on the numerical value of the solubility parameter of the diluent alone, but rather on the numerical value of its contribution to the weight averaged Hildebrand solubility parameter exhibited by the combination of liquid ingredients present in the plastisol. This contribution is calculated by multiplying the value of the solubility parameter of the ingredient by its concentration by weight in the mixture.

Additional Ingredients

In addition to the polymer, plasticizer and liquid diluent(s) plastisols may contain additional solid and/or liquid ingredients including but not limited to Fillers such as calcium carbonate;

Heat stabilizers such as the calcium and barium salts of fatty acids;

Esters of phosphoric acid;

Foaming agents such as azodicarbonamides;

Foaming catalysts such as zinc oxide;

Flame retarding agents;

Surfactants;

UV absorbers; and

Pigments such as titanium dioxide.

The solubility parameters of all liquid ingredients of the plastisol must be determined and these values included in the calculation of the weighted average solubility parameter value for the liquid phase.

The plastisols of the present invention are useful in end-use applications requiring rapid application of a low viscosity plastisol. These applications include but are not limited to 1) coatings that are applied onto metallic or non-metallic surfaces by dipping, spraying or the use of coating rollers and 2) as molding materials. The plastisols are particularly useful for coating on to layers of fabric, particularly those used in the construction of resilient floor coverings and wall coverings, and as spray coatings for metal surfaces. Molding applications include but are not limited to fabrication of shaped articles by techniques referred to as "slush molding", rotation molding and the use of both closed and open molds.

The following example describes two preferred embodiments of the present plastisol compositions and should not be interpreted as limiting the scope of the invention described in this specification and the accompanying claims. In the accompanying tables the parts of the two polyvinyl chloride resins are by weight. The amounts of all other ingredients of the plastisol are expressed as weights of these ingredients per 100 parts of the combined resins (PHR). Viscosity measurements were performed at 23° C. using 1) a Brookfield model RVT viscometer equipped with a spindle suitable for the viscosity range and rotating at a speed of 20 RPM and 2) an extrusion type rheometer available as model A-120 from Burrell-Severs.

Example 1

Plastisol compositions with liquid phases exhibiting weight averaged solubility parameters relative to polyvinyl chloride that were within and outside the limits that characterize the compositions of the present invention were prepared by blending to homogeneity the following ingredients:

60 parts of a dispersion grade polyvinyl chloride resin exhibiting an average particle size of from 0.5 to 5 microns. A suitable resin is available as one of the Geon® 170 series from Polyone;

40 parts of a blending grade polyvinyl chloride resin exhibiting an average particle size of from 20 to 55 microns and available as the Geon® 210 series from Polyone.

30 parts of a plasticizer consisting essentially of either butylbenzyl phthalate or a mixture containing 65 weight percent of diethylene glycol dibenzoate and 35 weight percent of dipropylene glycol dibenzoate 10 parts of 2,2,4-trimethyl-1,3-pentanedioldiisobutyrate as an auxiliary diluent and 30 parts of calcium carbonate as a filler.

The diluent for both 1) the plastisol containing BBP as the plasticizer, identified as formulation 1 in the accompanying tables, and 2) the plastisol containing the aforementioned mixture of benzoic acid esters and identified as control formulation A consisted of 18.0 parts of a mixture containing 14.4 parts of alkyl benzenes exhibiting a boiling temperature range of 282 to 301° C. and 3.6 parts of a mixture of normal paraffinic hydrocarbons, exhibiting a typical boiling temperature range of from 222 to 242° C.; and 5 parts of a mixture of aliphatic hydrocarbons exhibiting a typical boiling range of from 249 to 269° C.

The diluent for the plastisol identified as Formulation 2 that contained the same mixture of benzoic acid esters as control formulation A consisted of a combination of 7.2 parts of mixed cycloaliphatic hydrocarbons and 10.8 parts of a mixed paraffinic hydrocarbons, wherein the mixture exhibits a typical boiling range of from 214 to 230° C.; and 5 parts of a mixture alkanes and cycloalkanes exhibiting a typical boiling range of from 249 to 266° C.

Control formulation A contained the same types and amounts of ingredients as formulation 1 of the present invention, with the exception that mixture of benzoic acid esters of formulation 2 replaced BBP on an equal weight basis.

The viscosities of the three formulations are summarized in Table 2.

The calculated Hildebrand solubility parameters for the individual ingredients and the difference between the weighted average values of the solubility parameters for the liquid phases appear in Table 3.

TABLE 1

Plastisol Formulations

| Formula 1 | Formulation 1 PHR | Control Formulation A PHR | Formulation 2 PHR |
|---|---|---|---|
| Raw Material | | | |
| Dispersion Resin | 60 | 60 | 60 |
| Blending Resin | 40 | 40 | 40 |
| Butyl Benzyl Phthalate | 30 | 0 | 0 |
| Diethylene and Dipropylene glycol dibenzoate blend | 0 | 30 | 30 |
| 2,2,4-trimethyl-1,3-pentanediol diisobutyrate | 10 | 10 | 10 |
| Mixed Alkyl benzenes | 14.4 | 14.4 | 0 |
| Normal paraffins | 3.6 | 3.6 | 0 |
| Cycloaliphatics | 0 | 0 | 7.2 |
| Mixed paraffins | 0 | 0 | 10.8 |
| Mixed aliphatics | 5 | 5 | 5 |
| CaCO₃ Filler | 30 | 30 | 30 |

TABLE 2

Plastisol Viscosities

| Formula number | Formulation 1 | Control Formulation A | Formulation 2 |
|---|---|---|---|
| Brookfield RVT 20 RPM's, @ 23° C. | | | |
| Initial, mPa · s | 926 | 24000 | 1245 |
| 4 hour, mPa · s | 1036 | 25200 | 1836 |
| Extrusion rheometer, constant stress, 0.62 psi Initial, 23° C. | | | |
| Viscosity, mPa · s | 87 | 161 | 101 |
| Shear rate, sec⁻¹ | 49393 | 26596 | 42159 |
| 4 hour, 23° C. | | | |
| Viscosity, mPa · s | 92 | 191 | 114 |
| Shear rate, sec⁻¹ | 46227 | 22415 | 37179 |

TABLE 3

| Raw Material | Solubility Parameter | FORMULATION 1 | | | CONTROL FORMULATION A | | | FORMULATION 2 | | |
|---|---|---|---|---|---|---|---|---|---|---|
| | | PHR | % | SP | PHR | % | SP | PHR | % | SP |
| Dispersion Resin | | 60 | | | 60 | | 0.00 | 60 | | 0.00 |
| Blending Resin | | 40 | | | 40 | | 0.00 | 40 | | 0.00 |

TABLE 3-continued

| Raw Material | Solubility Parameter | FORMULATION 1 | | | CONTROL FORMULATION A | | | FORMULATION 2 | | |
|---|---|---|---|---|---|---|---|---|---|---|
| | | PHR | % | SP | PHR | % | SP | PHR | % | SP |
| Butyl Benzyl Phthalate | 9.88 | 30 | 0.48 | 4.70 | 0 | 0.00 | 0.00 | 0 | 0.00 | 0.00 |
| Diethylene and Dipropylene glycol dibenzoate blend | 10.105 | 0 | 0.00 | 0.00 | 30 | 0.48 | 4.81 | 30 | 0.48 | 4.81 |
| 2,2,4-trimethyl-1,3-pentanediol diisobutyrate | 8.476 | 10 | 0.16 | 1.35 | 10 | 0.16 | 1.35 | 10 | 0.16 | 1.35 |
| Mixed Alkyl benzenes | 8.41 | 14.4 | 0.23 | 1.92 | 14.4 | 0.23 | 1.92 | 0 | 0.00 | 0.00 |
| Normal paraffins | 7.2 | 3.6 | 0.06 | 0.41 | 3.6 | 0.06 | 0.41 | 0 | 0.00 | 0.00 |
| Cycloaliphatics | 7.5 | 0 | 0.00 | 0.00 | 0 | 0.00 | 0.00 | 7.2 | 0.11 | 0.86 |
| Mixed paraffins | 7.5 | 0 | 0.00 | 0.00 | 0 | 0.00 | 0.00 | 10.8 | 0.17 | 1.29 |
| Mixed aliphatics | 7.2 | 5 | 0.08 | 0.57 | 5 | 0.08 | 0.57 | 5 | 0.08 | 0.57 |
| $CaCO_3$ Filler | | 30 | | 0.00 | 30 | 0.48 | 0.00 | 30 | | 0.00 |
| | Total Parts | 193 | 1.00 | | 193.00 | 1.48 | | 193.00 | 1.00 | |
| | Parts of Liquid | 63 | | | 63 | | | 63 | | |
| Solubility Parameter Values | | Plasticizer (P) | 4.70 | | | 4.81 | | | 4.81 | |
| | | Solvent (S) | 4.25 | | | 4.25 | | | 4.06 | |
| | | Total P + S | 8.96 | | | 9.06 | | | 8.87 | |
| | | PVC | 9.60 | | | 9.60 | | | 9.6 | |
| | | P and S Diff | 0.45 | | | 0.56 | | | 0.75 | |
| | | Liquids vs. PVC Diff. | 0.64 | | | 0.54 | | | 0.73 | |

The data in Table 3 demonstrate that when the difference between a) the weight averaged values of the Hildebrand solubility parameters for all of the liquid ingredients, which included the liquid hydrocarbons, diisobutyrate, and plasticizer and b) the solubility parameter of the polyvinyl chloride are within the present range of 0.6 to 1, as in formulations 1 and 2, the viscosity of the plastisol was in a useful range.

For Control A the difference of 0.54 between the solubility parameter (SP) of PVC and the weighted average of the SP values of the liquids was below the present range, indicating that the combination of liquid ingredients is too compatible with polyvinyl chloride. It appears that the observed substantial increase in plastisol viscosity resulted from swelling of the polymer particles due to this increase in compatibility between polymer and liquid ingredients.

Example 2

Miscibility evaluations provided the following results.
Miscibilty Evaluation

| | Butyl Benzyl Phthalate | Diethylene and Dipropylene glycol dibenzoate blend | Mixed alkyl benzenes and normal parafin blend | Cycloaliphatics and mixed paraffin blend | 2,2,4-trimethyl-1,3-pentanediol diisobutyrate | Solution |
|---|---|---|---|---|---|---|
| Solution 1 | 30 | | 18 | | | Miscible |
| Solution 2 | | 30 | 18 | | | Not Miscible |
| Solution 3 | | 30 | 18 | | 3 | Miscible |
| Solution 4 | | 30 | | 18 | | Not Miscible |
| Solution 5 | | 30 | | 18 | 12 | Miscible |

That which is claimed is:

1. A plastisol comprising:
   A. a dispersed phase comprising particles of polyvinyl chloride polymer; and
   B. a liquid phase comprising 1) a plasticizer for said polymer, the plasticizer selected from the group consisting of diesters of benzoic acid and dihydric alcohols, diethylene glycol, triethylene glycol, propylene glycol, dipropylene glycol and 1,3-butanediol, and 2) from 5 to 55 weight percent, based on the total weight of said liquid phase, of an organic diluent;
   wherein a weighted average of individual Hildebrand solubility parameter values for ingredients of the liquid phase of said plastisol differs from Hildebrand solubility parameter value of said polymer by about ±0.6 to about ±1.0, and
   wherein the plastisol has a lower viscosity than a plastisol where a weighted average of individual Hildebrand solubility parameter values for ingredients of the liquid phase differs from Hildebrand solubility parameter value of the polymer by an amount outside of a range of about ±0.6 to about ±1.0.

2. The plastisol according to claim 1 wherein said plastisol further comprises at least one ingredient selected from the group consisting of fillers, pigments, heat stabilizers, lubricants, flame retardants, esters of phosphoric acid, foaming agents, foaming catalysts, surfactants and UV absorbers.

3. The plastisol according to claim 1 wherein said fusible organic polymer is a blend of a dispersion grade and a blending grade of polyvinyl chloride and the plasticizer is a blend of the dibenzoates of diethylene glycol and dipropylene glycol.

4. The plastisol according to claim 3 wherein the diluent comprises a liquid mixture of cycloaliphatic hydrocarbons and both linear and branched paraffinic hydrocarbons.

5. The plastisol according to claim 4 wherein said liquid phase additionally comprises at least one auxiliary plasticizer selected from the group consisting of monoesters of benzoic acid and aliphatic diols containing from 2 to 8 carbon atoms, esters of benzoic acid and monohydric alcohols, and liquid esters derived from aliphatic diols containing from 2 to 8 carbon atoms and carboxylic acids containing from 2 to 8 carbon atoms.

6. The plastisol according to claim 5 wherein said auxiliary plasticizer is a least one ester of benzoic acid and a monohydric alcohol.

7. A coating composition comprising a plastisol of claim 1 as a film-forming ingredient, wherein said composition is effective for application to a substrate by dipping, spraying or the use of rollers.

8. The coating composition according to claim 7 wherein said substrate is selected from the group consisting of fabrics for fabrication of resilient floor coverings, wall coverings, and metal surfaces.

9. A composition effective for preparing self-supporting films, wherein said composition comprises the plastisol of claim 1 as the film-forming ingredient.

10. A molding composition effective for providing a molded article, the molding composition comprising a plastisol composition of claim 1.

11. A plastisol composition effective for providing a coating binder, the plastisol comprising:
    A. a dispersed phase comprising particles of polyvinyl chloride polymer; and
    B. a liquid phase comprising 1) a plasticizer for said polymer, the plasticizer selected from the group consisting of diesters of benzoic acid and dihydric alcohols, diethylene glycol, triethylene glycol, propylene glycol, dipropylene glycol and 1,3-butanediol, and 2) from 5 to 55 weight percent, based on the total weight of said liquid phase, of an organic diluent;
    wherein a weighted average of individual Hildebrand solubility parameter values for ingredients of the liquid phase of said plastisol differs from Hildebrand solubility parameter value of said polymer by about ±0.6 to about ±1.0, and
    wherein the plastisol has a lower viscosity than a plastisol where a weighted average of individual Hildebrand solubility parameter values for ingredients of the liquid phase differs from Hildebrand solubility parameter value of the polymer by an amount outside of a range of about ±0.6 to about ±1.0.

12. The plastisol according to claim 11 wherein said plastisol further comprises at least one ingredient selected from the group consisting of fillers, pigments, heat stabilizers, lubricants, flame retardants, esters of phosphoric acid, foaming agents, foaming catalysts, surfactants and UV absorbers.

13. The plastisol according to claim 11 wherein said fusible organic polymer is a blend of a dispersion grade and a blending grade of polyvinyl chloride and the plasticizer is a blend of the dibenzoates of diethylene glycol and dipropylene glycol.

14. The plastisol according to claim 13 wherein the diluent comprises a liquid mixture consisting essentially of cycloaliphatic hydrocarbons and both linear and branched paraffinic hydrocarbons.

15. The plastisol according to claim 14 wherein said liquid phase additionally comprises at least one auxiliary plasticizer selected from the group consisting of monoesters of benzoic acid and aliphatic diols containing from 2 to 8 carbon atoms, esters of benzoic acid and monohydric alcohols, and liquid esters derived from aliphatic diols containing from 2 to 8 carbon atoms and carboxylic acids containing from 2 to 8 carbon atoms.

16. The plastisol according to claim 15 wherein said auxiliary plasticizer is a least one ester of benzoic acid and a monohydric alcohol.

17. A method for preparing a plastisol composition comprising blending a dispersed phase comprising particles of polyvinyl chloride polymer and a liquid phase comprising a plasticizer for said polymer, the plasticizer selected from the group consisting of diesters of benzoic acid and dihydric alcohols, diethylene glycol, triethylene glycol, propylene glycol, dipropylene glycol and 1,3-butanediol, and from 5 to 55 weight percent, based on the total weight of said liquid phase, of an organic diluent;
    wherein a weighted average of individual Hildebrand solubility parameter values for ingredients of the liquid phase of said plastisol differs from Hildebrand solubility parameter value of said polymer by about ±0.6 to about ±1.0, and
    wherein the method is effective for providing a plastisol having a lower viscosity than a plastisol where a weighted average of individual Hildebrand solubility parameter values for ingredients of the liquid phase differs from Hildebrand solubility parameter value of the polymer by an amount outside of a range of about ±0.6 to about ±1.0.

18. The method according to claim 17 wherein said plastisol further comprises at least one ingredient selected from the group consisting of fillers, pigments, heat stabilizers, lubricants, flame retardants, esters of phosphoric acid, foaming agents, foaming catalysts, surfactants and UV absorbers.

19. The method according to claim 17 wherein said fusible organic polymer is a blend of a dispersion grade and a blending grade of polyvinyl chloride and the plasticizer is a blend of the dibenzoates of diethylene glycol and dipropylene glycol.

20. The method according to claim 19 wherein the diluent comprises a liquid mixture consisting essentially of cycloaliphatic hydrocarbons and both linear and branched paraffinic hydrocarbons.

21. The method according to claim 20 wherein said liquid phase additionally comprises at least one auxiliary plasticizer selected from the group consisting of monoesters of benzoic acid and aliphatic diols containing from 2 to 8 carbon atoms, esters of benzoic acid and monohydric alcohols, and liquid esters derived from aliphatic diols containing from 2 to 8 carbon atoms and carboxylic acids containing from 2 to 8 carbon atoms.

22. The method according to claim 21 wherein said auxiliary plasticizer is a least one ester of benzoic acid and a monohydric alcohol.

* * * * *